United States Patent [19]

Chesler et al.

[11] 4,110,527
[45] Aug. 29, 1978

[54] VINYL CHLORIDE POLYMERIZATION USING SELECTED AMOUNTS OF AIR, OXYGEN OR NITROGEN

[75] Inventors: Edwin T. Chesler, Riverside, R.I.; Donald Goodman, Flemington, N.J.; Milton Lapkin, Barrington, R.I.

[73] Assignee: Olin Corporation, New Haven, Conn.

[21] Appl. No.: 355,834

[22] Filed: Apr. 30, 1973

[51] Int. Cl.² .......................... C08F 4/32; C08F 4/28; C08F 14/06
[52] U.S. Cl. .................................. 526/235; 526/200; 526/344.2; 526/909
[58] Field of Search .......................................... 526/235

[56] References Cited

U.S. PATENT DOCUMENTS

| 2,498,226 | 2/1950 | Sully | 260/89.1 |
| 3,538,061 | 11/1970 | Van Gaver | 260/78.5 |
| 3,661,867 | 5/1972 | Koyanagi | 260/78.5 |
| 3,663,520 | 5/1972 | Balwe | 260/87.5 |
| 3,766,159 | 10/1973 | Koyanagi | 260/92.8 W |

Primary Examiner—Christopher A. Henderson, Jr.
Attorney, Agent, or Firm—Robert J. Feltovic; Thomas P. O'Day; F. A. Iskander

[57] ABSTRACT

An improved method for preparing polyvinyl chloride resins by suspension polymerization wherein the reaction vessel is placed under a limited, selected atmosphere of air, oxygen or nitrogen gas prior to charging starting vinyl chloride monomer material.

1 Claim, 1 Drawing Figure

TOTAL PERCENT RESIN ON 60 MESH SCREEN
VERSUS MM HG. AIR

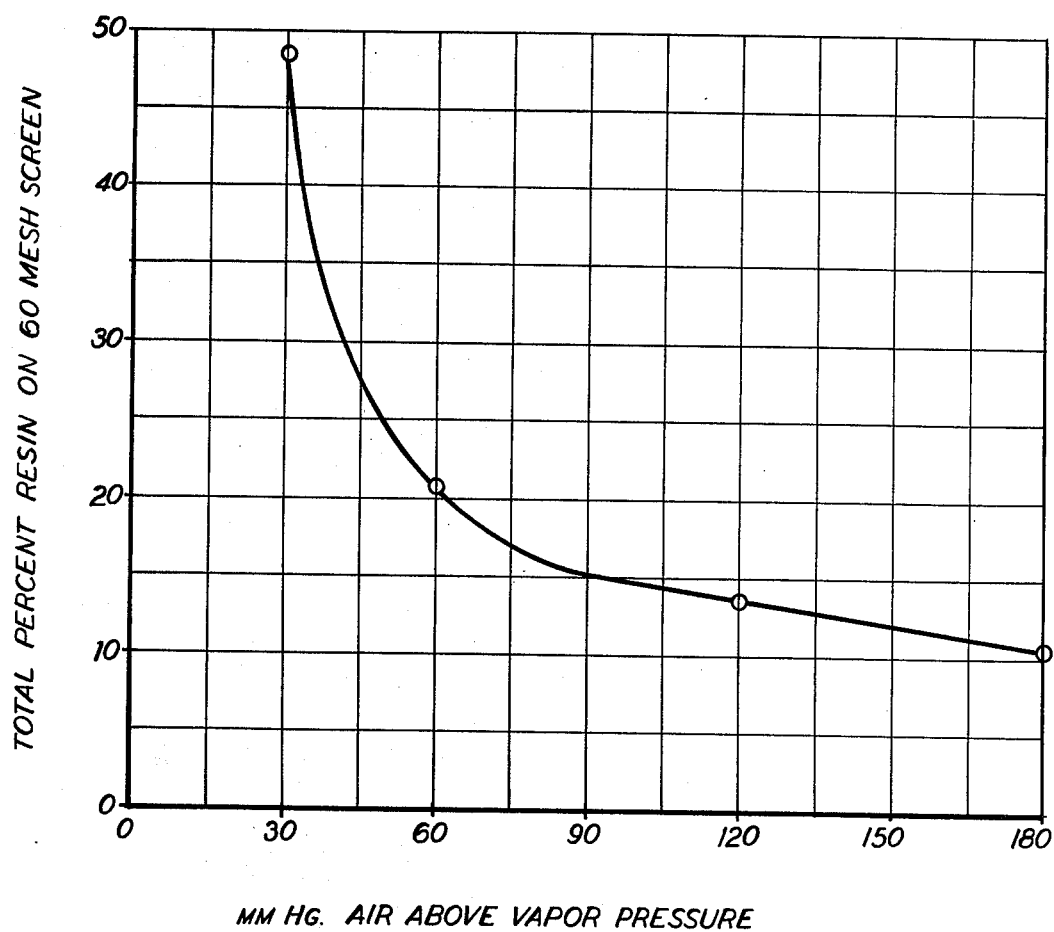

VINYL CHLORIDE POLYMERIZATION USING SELECTED AMOUNTS OF AIR, OXYGEN OR NITROGEN

This invention relates to an improved method for preparing polyvinyl chloride resins. More particularly the method of this invention involves suspension polymerization of vinyl chloride using an improved technique wherein the reaction vessel is placed under a limited and selected atmosphere of air, oxygen, or nitrogen gas prior to charging the polymerizable vinyl chloride monomer starting material.

Polymerization of vinyl chloride has been performed on a large scale for a number of years and several different methods of operation are known. Suspension polymerization is a widely used technique for preparing a variety of plastic resins including polyvinyl chloride. Generally in such polymerization techniques, it has been well known that the presence of air or oxygen in the reaction vessel greatly effects the rate of reaction. Consequently, previous techniques for the polymerization of vinyl chloride have generally involved removal of the air or oxygen present in the reaction vessel.

Now it has been found that while the presence of air and oxygen affect the reaction rate, even more important, the presence of such ingredients even in small concentrations greatly affects the properties and particularly the particle size of the polyvinyl chloride resin produced. Thus, it is noted that differences of a few parts per million of air, oxygen or nitrogen greatly affect the particle size distribution which in turn affects the dry blending characteristics, bulk density and the plasticizer absorption among other properties of the final resin. Consequently, it has been found that by controlling or maintaining a selected amount of air, oxygen or nitrogen gas in the reaction vessel prior to the charging of the vinyl chloride monomer, the properties of the final resin product can be controlled to a significantly desirable extent. Furthermore and significantly, the amount of suspending agent used when following such technique is greatly reduced.

The method of this invention may be carried out by charging the reaction vessel with water, suspending agent, an initiator and other additive materials, then evacuating or placing said reaction vessel under a limited, selected atmosphere of air, oxygen or nitrogen gas. Following this, the vinyl chloride monomer is charged into the vessel and the polymerization reaction commenced. While the procedure of evacuating or controlling the atmosphere in the reaction vessel as noted above may be carried out after all ingredients except the vinyl chloride monomer have been added, it is also permissible to add all such ingredients with the exception of water after the reaction vessel has been placed under the selected atmosphere. In other words, the particular order of charging the reaction ingredients is not critical.

In accordance with the method of this invention, the reaction vessel is evacuated or placed under an air, oxygen or nitrogen gas atmosphere of from about 10 to about 360 mm. of mercury absolute pressure above the water vapor pressure. Preferably the amount of such gas ingredients is maintained at an absolute pressure of from about 30 to about 180 and more preferably from about 60 to about 120 mm. of mercury in all instances above the water vapor pressure.

The term absolute pressure as used herein in the specification and the claims means the pressure above absolute zero excluding the vapor pressure of water at the particular temperature.

While it is noted that air, oxygen or nitrogen may be used in the method of this invention, it is preferred to use air or oxygen, since such gases exert a more pronounced effect on the properties and particularly the particle size of the resin.

A wide variety of known monomer materials, polymerized by suspension techniques, may be used in the method of this invention. More particularly vinyl chloride is the principle monomeric material which is used and it may be used alone or in combination with other monomeric materials such as vinyl acetate and vinylidene chloride. Other monomeric materials which also may be used are disclosed in "Polymerization in Suspension" by E. Trommsdorff et al in *Polymer Process*, Vol. 10, Interscience Publishers, 1955, pp. 69–109.

Polymerization reaction of this invention is promoted by a catalyst such as a free radical initiator which is soluble in the monomer phase. Generally a wide variety of catalyst initiators may be used including organic peroxides, peroxydicarbonates, hydroperoxides and azo compounds. Examples of such initiators include: benzoyl diacetyl, lauroyl, caprylyl and tertiary-butyl peroxide, diisopropyl peroxy dicarbonate, di-2-ethylhexyl peroxy dicarbonate, azobisisobutyronitryl, azobis-$\alpha$-$\gamma$-dimethylvaleronitrile, tertiary-butylperoxy pivalate and acetyl cyclohexane sulfonyl peroxide. Other initiators well known in the art as disclosed for example in the Trommsdorff et al article, noted above, may also be used.

The suspension polymerization method of this invention may incorporate a suspending or granulating agent. A wide variety of suspending agents may be used including: polyvinyl alcohols, cellulose ethers or other cellulose derivatives, gelatins, starches, gums, alginates, zein, casein, and the insoluble inorganic compounds of magnesium and calcium. Exemplary of such suspending agents are the following compounds: methoxy cellulose, hydroxyethyl cellulose, methoxy hydroxypropyl cellulose, sodium salt of carboxymethyl cellulose, magnesium carbonate and calcium phosphate. Other useful suspending agents are disclosed in the Trommsdorff et al article, cited earlier.

The suspending medium in which the suspension polymerization method of this invention is carried out is a liquid in which both the monomer and polymer are essentially insoluble and most often water is used. The amount of water can vary over a wide range and more particularly will be from about 1:1 to about 10:1 and preferably from about 1.5:1 to about 5:1 parts of water to monomer on a weight basis.

The amount of initiator employed will generally vary from about 0.001 to about 3.0% by weight of monomer charged and preferably from about 0.01 to about 0.6%. The amount of suspending or granulating agent used will generally vary from about 0.005 to about 0.5% by weight of monomer charged and preferably from about 0.01 to about 0.2%.

The reaction temperature may ve varied and generally will be from about 80 to about 250° F. and preferably from about 100° to about 180° F. The reaction pressure can vary widely and presures of up to about 10,000 psi. or higher may be used with about 50 to about 200 psi. being preferred.

Mechanical stirring or agitation of the reaction medium is generally employed to provide proper monomer distribution.

As is well known in the art, the properties of the polymer resin produced will vary and can be controlled by adjusting the various conditions and additionally other additives such as emulsifiers and buffers may be added to further vary the particular properties of the polymer product.

The product polymers produced by the method of this invention like the many polyvinyl chloride products on the market have a wide variety of uses including for example, films and sheets, flooring, packaging and coating applications such as for cables, pipe, siding and other rigid applications.

The following examples are further illustrative of this invention.

EXAMPLE I

Two hundred twenty-eight parts of demineralized water, 0.12 parts of Methocel 90HG35 (a hydroxypropylmethyl-cellulose), 0.3 parts of sorbitan monostearate and 0.03 parts of 2-ethylhexyl peroxydicarbonate were charged to a 50 gallon jacketed reactor equipped with an agitator. The reactor was then evacuated to provide an atmosphere of 30 mm. Hg. absolute air pressure above the water vapor pressure.

One hundred twenty parts of vinyl chloride monomer was then charged and the reaction mixture agitated at 125 RPM and heated to a temperature of 127° F. These conditions were maintained for about 11.25 hours after which the reactor was cooled and the residual vinyl chloride monomer vented off.

The particle size distribution of the resulting polymer resin was as follows:

Particle size distribution

% on 40 mesh; 0
% on 60 mesh, 48.53
% on 80 mesh; 39.10
% on 100 mesh; 8.40
% on 140 mesh; 2.20
% on 200 mesh; 0.97
% on Pan; 1.07

EXAMPLE II

Using the same procedure as Example I except using an absolute air pressure of 60 mm. Hg. above the water vapor pressure and a reaction time of about 12.75 hours, a vinyl chloride polymer resin was obtained having the following particle size distribution:

Particle size distribution

% on 40 mesh; 0
% on 60 mesh; 20.97
% on 80 mesh; 33.53
% on 100 mesh; 18.30
% on 140 mesh; 11.77
% on 200 mesh; 11.83
% on Pan; 3.60

EXAMPLE III

Using the same procedure as Example I except using an absolute air pressure of 120 mm. Hg. above the water vapor pressure and a reaction time of about 13.08 hours, a vinyl chloride polymer resin was obtained having the following particle size distribution:

Particle size distribution

% on 40 mesh; 0
% on 60 mesh; 13.8
% on 80 mesh; 36.2
% on 100 mesh; 21.87
% on 140 mesh; 12.33
% on 200 mesh; 12.70
% on Pan; 3.10

EXAMPLE IV

Using the same procedure as Example I except using an absolute air pressure of 180 mm. Hg. above the vapor pressure and a reaction time of about 11.58 hours, a vinyl chloride polymer resin was obtained having the following particle size distribution:

Particle size distribution

% on 40 mesh; 0
% on 60 mesh; 10.67
% on 80 mesh; 46.30
% on 100 mesh; 25.77
% on 140 mesh; 11.40
% on 200 mesh; 4.33
% on Pan; 1.53

The attached drawing is a graph showing the amounts of resin accumulated on a 60 mesh screen for various air pressures as determined in Examples I to IV. This demonstrates that the number of large resin particles has decreased as the amount of air is increased or in other words, there is a finer particle size distribution with increased amounts of air. Similar results were obtained using oxygen or nitrogen in place of air, however, it was generally found that larger amounts of nitrogen were required to obtain the same particle size.

What is claimed is:

1. In the method for preparing vinyl chloride polymers by suspension polymerization in which a vinyl chloride monomer is suspended in an aqueous medium which contains an initiator and a suspending agent, the improvement comprising maintaining a limited amount of oxygen gas in the reactor by placing said reactor under an atmosphere of said gas of from about 60 to about 120 mm Hg of absolute pressure above the water vapor pressure prior to charging the vinyl chloride monomer to the reactor.

* * * * *